US012637614B2

(12) United States Patent
Ge

(10) Patent No.: US 12,637,614 B2
(45) Date of Patent: May 26, 2026

(54) PREPARATION METHOD OF CORE-SHELL QUANTUM DOT AND CORE-SHELL QUANTUM DOT

(71) Applicant: TCL TECHNOLOGY GROUP CORPORATION, Huizhou (CN)

(72) Inventor: Jianchao Ge, Huizhou (CN)

(73) Assignee: TCL TECHNOLOGY GROUP CORPORATION, Huizhou (CN)

( * ) Notice: Subject to any disclaimer, the term of this patent is extended or adjusted under 35 U.S.C. 154(b) by 530 days.

(21) Appl. No.: 18/270,705

(22) PCT Filed: Dec. 27, 2021

(86) PCT No.: PCT/CN2021/141744
§ 371 (c)(1),
(2) Date: Jun. 30, 2023

(87) PCT Pub. No.: WO2022/143555
PCT Pub. Date: Jul. 7, 2022

(65) Prior Publication Data
US 2024/0158695 A1 May 16, 2024

(30) Foreign Application Priority Data
Dec. 31, 2020 (CN) .......................... 202011636048.3

(51) Int. Cl.
*C09K 11/88* (2006.01)
*B82Y 20/00* (2011.01)
(Continued)

(52) U.S. Cl.
CPC .......... *C09K 11/883* (2013.01); *C09K 11/025* (2013.01); *B82Y 20/00* (2013.01); *B82Y 40/00* (2013.01)

(58) Field of Classification Search
CPC ..... C09K 11/883; C09K 11/025; B82Y 20/00; B82Y 40/00
(Continued)

(56) References Cited

U.S. PATENT DOCUMENTS 8,858,707 B2 10/2014 Heitsch et al.
2002/0172820 A1 11/2002 Majumdar et al.
(Continued)

FOREIGN PATENT DOCUMENTS

CN 102439068 A 5/2012
CN 105511150 A 4/2016
(Continued)

OTHER PUBLICATIONS

International Search Report dated Mar. 30, 2022; International Application No. PCT/CN2021/141744; 3 pages.
(Continued)

*Primary Examiner* — Anita Nassiri-Motlagh

(57) ABSTRACT

The present application discloses a preparation method of a core-shell quantum dot and a core-shell quantum dot. The preparation method of the core-shell quantum dot includes the following steps: providing a silicon quantum rod; growing a cadmium-free semiconductor shell layer on a surface of the silicon quantum rod to obtain a core-shell quantum dot. The present application grows the cadmium-free semiconductor shell layer on the surface of silicon quantum rod, and the core-shell quantum dot obtained in this way includes a silicon quantum rod and a cadmium-free semiconductor shell layer coated on the surface of silicon quantum rod.

20 Claims, 1 Drawing Sheet

(51) Int. Cl.
*B82Y 40/00* (2011.01)
*C09K 11/02* (2006.01)

(58) Field of Classification Search
USPC ..................................................... 252/301.36
See application file for complete search history.

(56) References Cited

U.S. PATENT DOCUMENTS

| | | |
|---|---|---|
| 2012/0077034 A1 | 3/2012 | Heitsch et al. |
| 2017/0002266 A1 | 1/2017 | Coropceanu et al. |

FOREIGN PATENT DOCUMENTS

| | | |
|---|---|---|
| CN | 112824477 A | 1/2020 |
| CN | 110951477 A | 4/2020 |
| CN | 111394091 A | 7/2020 |
| CN | 107573923 A | 2/2022 |
| CN | 110452684 A | 4/2022 |
| CN | 202499839 U | 8/2022 |
| IN | 109929546 A | 5/2021 |
| KR | 20140070770 A | 6/2014 |

OTHER PUBLICATIONS

Written Opinion dated Mar. 30, 2022; International Application No. PCT/CN2021/141744; 3 pages.

PREPARATION METHOD OF CORE-SHELL QUANTUM DOT AND CORE-SHELL QUANTUM DOT

CROSS-REFERENCE TO RELATED APPLICATIONS

This application is the national phase entry of International Application No. PCT/CN2021/141744, filed on Dec. 27, 2021, which is based upon and claims priority to the Chinese Patent Application No. 202011636048.3, filed on Dec. 31, 2020, the entire contents each of which are incorporated herein by reference.

TECHNICAL FIELD

The present application relates to the technical field of nanomaterials, and in particular, to a preparation method of a core-shell quantum dot and a core-shell quantum dot.

BACKGROUND

Quantum dot (QD) has become a research hotspot of a new generation of fluorescent display nanomaterials due to its advantages such as adjustable wavelength, high color saturation, good material stability, and low preparation cost. The optical properties of quantum dots can be adjusted by artificially controlling the ions and surface ligands.

Traditional quantum dots often contain toxic heavy metal cadmium. Due to the wide use of cadmium in nanomaterials and its long half-life, cadmium-containing quantum dots have adverse effects on the environment. Therefore, cadmium-free quantum dots have become the focus of nanomaterials, but the types and preparation processes of cadmium-free quantum dots are currently limited.

SUMMARY

One of the objectives of the embodiments of the present application is to provide a preparation method of a core-shell quantum dot and a core-shell quantum dot.

The technical proposals that the embodiment of the present application adopts are as follows:

In a first aspect, a method for preparing a core-shell quantum dot is provided, including the steps of:

providing a silicon quantum rod; and growing a cadmium-free semiconductor shell layer on a surface of the silicon quantum rod to obtain a core-shell quantum dot.

In a second aspect, a core-shell quantum dot is provided, including a silicon quantum rod and a cadmium-free semiconductor shell layer coated on the surface of the silicon quantum rod.

The advantageous effect of the preparation method of the core-shell quantum dot provided by the embodiment of the present application is that the present application directly grows a cadmium-free semiconductor shell layer on the surface of the silicon quantum rod, and the core-shell quantum dot obtained in this way include a silicon quantum rod and a cadmium-free semiconductor shell layer on the surface of the silicon quantum rod. The preparation method replaces the traditional cadmium-containing quantum dot material with the core-shell quantum dot of the cadmium-free material, thereby avoiding the heavy metal pollution hazard in the subsequent application, and at the same time improving the overall biological affinity and utilization of the core-shell quantum dot; and the coating of cadmium-free semiconductor shell can improve the oxidation resistance and stability of silicon quantum rod, thereby improving the luminescence performance of the core-shell quantum dot.

The advantageous effect of the core-shell quantum dot provided by the embodiment of the present application is that the core-shell quantum dot of the present application is a core-shell quantum dot with a silicon quantum rod as the core and a cadmium-free semiconductor shell as the shell. With such a core-shell quantum dot, not only is there no heavy metal pollution hazard of cadmium, but the overall biological affinity and utilization of the core-shell quantum dots are improved through the silicon material; at the same time, the surface of the silicon quantum rod is coated with a cadmium-free semiconductor shell, which not only improves the oxidation resistance of the silicon quantum rod, and improves its stability, so the core-shell quantum dot has good luminous properties, and have good applications in light-emitting devices.

DESCRIPTION OF DRAWINGS

In order to more clearly illustrate the technical proposals in the embodiments of the present application, the accompanying drawings to be used in the embodiments or exemplary technical descriptions will be briefly introduced below. Obviously, the accompanying drawings in the following descriptions are only some embodiments of the present application. Those skilled in the art can also obtain other drawings based on these drawings without creative efforts.

DETAILED DESCRIPTION OF THE EMBODIMENTS

In order to make the purpose, technical proposals, and advantages of the present application clearer, the present application will be further described in detail below in conjunction with the accompanying drawings and embodiments. It should be understood that the specific embodiments described here are only used to explain the present application, not to limit the present application.

In the present application, "at least one" means one or more, and "a plurality of" means two or more. "At least one of the following" or similar expressions refer to any combination of these items, including any combination of single or plural items.

It should be understood that in various embodiments of the present application, the sequence numbers of the above-mentioned processes do not represent the order of execution, and some or all steps may be executed in parallel or sequentially, and the execution order of each process shall be determined based on its functions and the internal logic and should not constitute any limitation to the implementation process of the embodiment of the present application.

Terms used in the embodiments of the present application are only for the purpose of describing specific embodiments, and are not intended to limit the present application. The singular forms "a", "said" and "the" used in the embodiments of the present application and the appended claims are also intended to include plural forms unless the context clearly indicates otherwise.

In order to illustrate the technical proposals provided by the present application, detailed descriptions will be given below in conjunction with specific drawings and embodiments.

Figure 1:
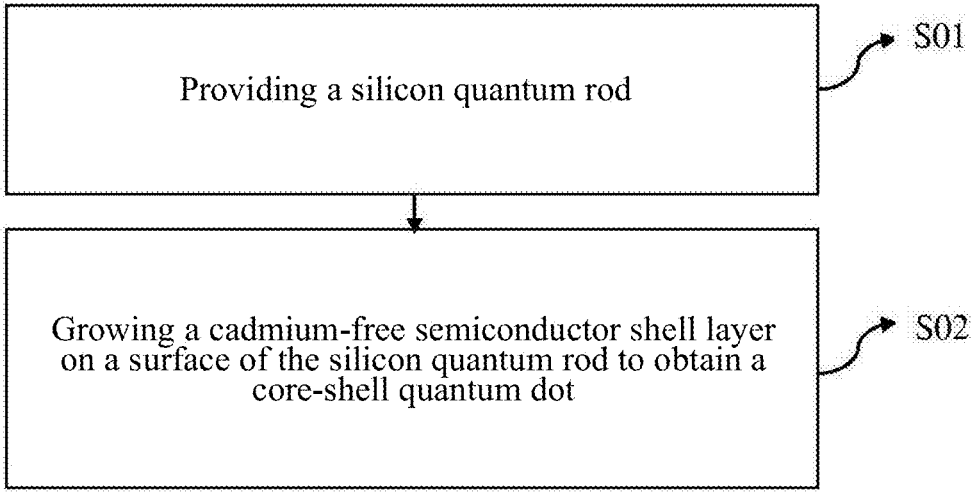
FIG. 1 is a flow chart of the preparation method of the core-shell quantum dot of an embodiment of the present application.

Some embodiments of the present application provide a preparation method of a core-shell quantum dot, as shown in FIG. 1, the preparation method includes the following steps:

S01: providing a silicon quantum rod;

S02: growing a cadmium-free semiconductor shell layer on a surface of the silicon quantum rod to obtain a core-shell quantum dot.

The preparation method of a core-shell quantum dot provided in the embodiments of the present application directly grows a cadmium-free semiconductor shell layer on the surface of silicon quantum rod, and the core-shell quantum dot obtained in this way include a silicon quantum rod and a cadmium-free semiconductor shell layer coated on the surface of silicon quantum rods. The embodiment of the present application replaces the traditional cadmium-containing quantum dot material by preparing a cadmium-free core-shell quantum dot, so as to avoid the heavy metal pollution hazard in the subsequent application of core-shell quantum dots, and at the same time improve the overall biological affinity and utilization of the core-shell quantum dots, thus expanding the range of application fields. Moreover, the cadmium-free semiconductor shell layer is coated on the surface of the silicon quantum rod, which not only improves the oxidation resistance of the silicon quantum rod, but also improves the stability thereof, so that it has good luminescence performance, and such quantum dots have a good application prospect in light-emitting devices.

The preparation method of a core-shell quantum dot provided in the embodiments of the present application directly uses a silicon quantum rod as the core to form a cadmium-free semiconductor shell layer. The rod-shaped silicon quantum rod can release the pressure caused by the lattice difference of the core-shell material into the shell layer, so that the crystal lattice of the core-shell interface will not be mismatched, and the core-shell quantum dot can exist stably.

In some embodiments, the preparation method of the silicon quantum rod in the above step S01 includes the following steps:

adding a silicon precursor and a gold nanoparticle into a solvent with a temperature ≥350° C., and directionally growing a silicon quantum rod on the gold nanoparticle to obtain an Au—Si nanorod; and cleaning the Au—Si nanorod to remove the gold nanoparticle to obtain a silicon quantum rod.

In the embodiment of the present application, the silicon precursor material and the gold nanoparticle are added to a high-temperature (≥350° C.) solvent for reaction, and bonds in the silicon precursor material break at a high temperature of ≥350° C. to form a monomeric molecular structure of Si (monomer), the generated silicon monomers grow directionally along the gold nanoparticle, so that a silicon nanorod is grown on the gold nanoparticle. At this time, the gold nanoparticle is still combined with the end of the silicon quantum rod, so an Au—Si nanorod is obtained, followed by cleaning to remove the Au at the end of the silicon quantum rod to obtain a pure silicon quantum rod.

Specifically, the silicon monomers are obtained by the degradation of the silicon precursor (such as trisilane) on the interface between the gold nanoparticle and the reaction solution catalyzed by the gold nanoparticle; local supersaturation due to the limited solubility of silicon monomers in the solution system induces the crystallization growth of silicon monomers on the surface of the gold nanoparticle. During the growth process, the contact point between the first crystallized Si and the gold nanoparticle is the only locally activated contact surface, which can lead to the subsequent unidirectional growth of silicon quantum rod, resulting in the formation of an Au—Si nanorod with a gold nanoparticle bonded to the end of a silicon quantum rod.

In the above method for preparing silicon quantum rods, the gold nanoparticle may be obtained by reducing gold ions. Specifically, tetraoctylammonium bromide (TOAB) and a tetrachloroauric acid solution may be mixed, and then a reducing agent may be added for a reduction reaction to obtain gold nanoparticles. In this process, tetraoctylammonium bromide is a phase transition agent; further, in the process of mixing tetraoctylammonium bromide and the tetrachloroauric acid solution, long-chain mercaptans (such as mercaptans with 10-20 carbon atoms) to stabilize the gold nanoparticles generated by the subsequent reduction.

In an embodiment, the synthesis of the gold nanoparticle includes: rapidly injecting a deionized aqueous solution of tetrachloroauric acid trihydrate into the stirred TOAB-toluene solution to obtain an emulsion, and then separating the gold ion-containing emulsion by a separatory funnel and adding the long-chain mercaptans; slowly injecting $NaBH_4$ into the above emulsion for a reduction reaction to obtain gold nanoparticles; and obtaining pure gold nanoparticles after repeated solvent-anti-solvent cleaning.

In the above-mentioned preparation method of the silicon quantum rod, the step of providing the silicon precursor and gold nanoparticle and adding the silicon precursor and the gold nanoparticle into a solvent with a temperature ≥350° C. includes: first, dispersing the gold nanoparticle in alkylamine to obtain a gold nanoparticle liquid dispersion, and then adding the gold nanoparticle liquid dispersion and the silicon precursor into the solvent. In this way, the gold nanoparticles can be fully dispersed in the system, so that the silicon quantum rod can better achieve a directional growth.

In some embodiments, the provided silicon precursor is at least one selected from trisilane and tetrasilane, and the silicon precursor can be broken to form a silicon monomer.

In some embodiments, the silicon precursor and the gold nanoparticle are added to the solvent and the solvent used for the reaction can be selected from at least one of trioctylphosphine and trioctylamine. The above solvents all have a high boiling point which are not easy to volatilize at a high temperature of ≥350° C., and provide a stable environment for the directional growth of silicon quantum rod on the gold nanoparticle.

In some embodiments, the temperature when the silicon precursor and gold nanoparticle are added to the solvent for the reaction is 350-450° C., that is, the silicon precursor and the gold nanoparticle are added to the solvent at a temperature of 350-450° C. for the directional growth of the silicon quantum rod to obtain an Au—Si nanorod.

In some embodiments, the step of cleaning the obtained Au—Si nanorods includes: first adding the Au—Si nanorod to chloroform and aqua regia (mixture of concentrated hydrochloric acid HCl and concentrated nitric acid $HNO_3$ in a volume ratio of 3:1), and then carrying out extraction. Specifically, the Au—Si nanorod is first dissolved in chloroform, and then mixed with aqua regia to obtain an emulsion by accelerated stirring, and then the aqua regia was removed by extraction to obtain the pure silicon quantum rod. The above process can clean the gold nanoparticle well and obtain the pure silicon quantum rod.

In some embodiments, in the above step S02, the step of growing a cadmium-free semiconductor shell layer on the surface of the silicon quantum rod includes: dissolving the alkylamine and the silicon quantum rod in an organic solvent, and then injecting the cadmium-free semiconductor precursor under heating for shell growth to obtain a cadmium-free semiconductor shell layer coated on the surface of the silicon quantum rod. In this way, a core-shell quantum dot with a silicon quantum rod as the core and a cadmium-free semiconductor shell layer as the shell can be formed.

In the above process, the presence of alkylamine can modify the surface of the silicon quantum rod so that the silicon quantum rod can be coated with a cadmium-free semiconductor shell layer in the oil phase. Specifically, through the modification of alkylamines, the N in the alkylamine directly forms two single bonds with the silicon surface, and the long-chain alkyl acts as a ligand branch on the surface of the silicon quantum rod to provide the silicon quantum rod with solubility and spatial stability. In the subsequent growth of the cadmium-free semiconductor shell layer of the silicon quantum rod, there may be no bond between the silicon quantum rod and the shell layer. Under the controlled reaction temperature, the anions and cations of the shell layer tend to attach to the surface of the existing ions in the system instead of growing from their own crystal nuclei. The long-chain alkylamine as a ligand is always in a dynamic equilibrium of attachment-dissociation on the surface of the silicon quantum rod. When the alkylamine ligand detaches from the gap on the surface of the silicon quantum rod, the shell ions will be adsorbed on the surface, and then the reattached alkylamine ligand will wrap the shell ions into the quantum dot system; therefore, in the final core-shell quantum dot, the alkylamine ligand is bound to the surface of the cadmium-free semiconductor shell layer.

In some embodiments, the alkylamine is selected from alkylamines with 10 to 20 carbon atoms, such as undecylamine, dodecylamine, tridecylamine, etc.; the above-mentioned amines are capable of well modifying the surface of the silicon quantum rod, to promote the growth of the cadmium-free semiconductor shell layer.

In some embodiments, the molar ratio of alkylamine to silicon atoms in the silicon quantum rod is 8-12:1; for example, 8:1, 9:1, 10:1, 11:1, and so on. Alkylamines with the above molar ratio range can fully modify the surface of silicon quantum rod.

In some embodiments, the alkylamine and the silicon quantum rod are dissolved in an organic solvent, and then the heating condition for injecting the cadmium-free semiconductor precursor material under heating is 220-310° C.; this temperature range can promote the growth of the cadmium-free semiconductor shell layer. Specifically, the heating rate is 11-12° C./min. For example, the heating rate can be fixed at 12° C./min from 220° C., until heating to 310° C. and being held.

In some embodiments, the number of injections of the cadmium-free semiconductor precursor material is at least one, and the cadmium-free semiconductor shell layer obtained in this way includes at least one layer of cadmium-free semiconductor material, such as two to four layers of cadmium-free semiconductor material; the shell layer composed of a plurality of layers of cadmium-free semiconductor material can provide a more stable protection for the silicon quantum rod.

In some embodiments, the semiconductor material of the cadmium-free semiconductor shell layer is one or more selected from a group II-VI compound, a group III-V compound, a group IV-VI compound, a group I-III-VI compound, and a group II-IV-VI compound, and is free of cadmium. The above-mentioned semiconductor materials are used to coat the silicon quantum rod to form the cadmium-free core-shell quantum dot.

In some embodiments, the method for preparing a core-shell quantum dot includes the following steps:

Step 1: rapidly injecting a deionized aqueous solution of tetrachloroauric acid trihydrate into a stirred TOAB-toluene solution to obtain an emulsion.

Step 2: separating a gold ion-containing emulsion through a separatory funnel, and adding a long-chain thiol (e.g. dodecanethiol).

Step 3: slowly injecting NaBH 4 into the above solution to obtain a gold nanoparticle; obtaining a pure gold nanoparticle through repeated solvent-anti-solvent cleaning, and then dispersing the pure gold nanoparticle in dodecylamine.

Step 4: preparing and mixing the above-mentioned dodecylamine solution of the gold nanoparticles with trisilane in a glove box, quickly injecting the mixture into a high-temperature solvent ≥350° C. (for example, 350-450° C.) to remove water and oxygen, and cooling down to room temperature (25° C.) to obtain an Au—Si quantum rod.

Step 5: using a mixed solution of chloroform and aqua regia to wash off the Au at the end of the Si quantum rod to obtain a pure silicon quantum rod.

Step 6: wash the obtained silicon quantum rod and dissolve it again in an organic solvent containing a certain amount of the same amine ligand.

Step 7: heating to a certain temperature (220-310° C.), and simultaneously injecting the anion and cation precursors required for the shell layer to grow the shell layer.

Step 8: cleaning the generated core-shell quantum dot material to obtain the final core-shell quantum dot.

Some embodiments of the present application also provide a core-shell quantum dot, including a silicon quantum rod and a cadmium-free semiconductor shell layer coated on the surface of the silicon quantum rod.

The core-shell quantum dot provided in the embodiments of the present application is a core-shell quantum dot with a silicon quantum rod as the core and a cadmium-free semiconductor shell layer as the shell. Such core-shell quantum dot not only has no cadmium heavy metal pollution hazards, but also improves the overall biological affinity and utilization of the core-shell quantum dot, and expands the scope of specific application fields; at the same time, the surface of the silicon quantum rod is coated with a cadmium-free semiconductor shell layer, which not only improves the oxidation resistance of silicon quantum rod, but also improves its, so such core-shell quantum dots has good light-emitting properties, which has good application prospects in light-emitting devices.

Specifically, the core-shell quantum dot is prepared by the above-mentioned core-shell quantum dot preparation method in the embodiment of the present application, and the core-shell quantum dot obtained by the preparation method includes a silicon quantum rod and a cadmium-free semiconductor shell layer coated on the surface of the silicon quantum rod.

In some embodiments, an alkylamine ligand is bound to the surface of the cadmium-free semiconductor shell layer. Specifically, the core-shell quantum dot is composed of a silicon quantum rod, a cadmium-free semiconductor shell layer coated on the surface of the silicon quantum rod, and an alkylamine ligand bound to the surface of the cadmium-free semiconductor shell layer. The alkylamine ligand can further improve the dispersion and stability of core-shell quantum dot. Specifically, during the coating process of the cadmium-free semiconductor shell layer, the alkylamine ligand is first bound to the surface of the silicon quantum rod; the alkylamine ligand is in a dynamic detached-attached state on the surface of the silicon quantum rod material. During the coating process, when the ligand is in the detached state, the shell layer is stacked on the surface of the silicon quantum rod, and through the continuous dynamic detachment and attachment of the ligands on the surface of the silicon quantum rod material in all directions, the shell material can completely cover the surface of the original silicon quantum rod material; finally the alkylamine ligand is wrapped around the outermost cadmium-free semiconductor shell layer.

In some embodiments, the alkylamine ligand is selected from alkylamine ligands with 10 to 20 carbon atoms; such as undecylamine, dodecylamine, tridecylamine, etc.; the above-mentioned types of amines can be well bound on the surface of the cadmium-free semiconductor shell layer of the core-shell quantum dot, so as to improve the overall dispersion and stability of the core-shell quantum dot and prevent agglomeration in the solvent.

In some embodiments, the molar ratio of the alkylamine ligands to the silicon atoms in the silicon quantum rod is 8-12:1. Alkylamines within the above molar ratio range can fully modify the surface of core-shell quantum dot.

In some embodiments, the cadmium-free semiconductor shell layer includes at least one layer of the cadmium-free semiconductor material; for example, two to four layers of the cadmium-free semiconductor material. The shell layer composed of a plurality of layers of the cadmium-free semiconductor material can provide a more stable protective effect for the silicon quantum rod.

In some embodiments, the semiconductor material of the cadmium-free semiconductor shell is one or more selected from a group II-VI compound, a group III-V compound, a group IV-VI compound, a group I-III-VI compound and a group II-IV-VI compound, and is free of cadmium. The above-mentioned semiconductor materials are used to coat the silicon quantum rod to form the cadmium-free core-shell quantum dot.

In addition, the room temperature in the examples of the present application refers to a temperature of 25-27° C.

Several tests have been carried out for the present application, and a part of the test results are given as a reference to further describe the application in detail, and are described in detail below in conjunction with specific examples.

Example 1

A core-shell quantum dot includes a silicon quantum rod and a cadmium-free semiconductor shell layer coated on the surface of the silicon quantum rod. A preparation method therefor includes the following steps:
(1) Preparation of Silicon Quantum Rod 1.1 4 mmol of tetraoctylammonium bromide (TOAB) was dissolved in 80 mL of toluene to obtain a tetraoctylammonium bromide solution, 0.77 mmol of tetrachloroaurate trihydrate was dissolved in 30 mL of deionized water to obtain a tetrachloroaurate trihydrate solution. The above-mentioned tetraoctylammonium bromide solution was rapidly stirred at 600 rpm, and the tetrachloroauric acid trihydrate solution was rapidly added, an emulsion was obtained through a separating funnel after 1 hr, and 0.84 mmol of dodecanethiol was added and stirred for 5 min; a NaBH 4 solution at 0.4 M was injected for a reduction reaction, and pure gold nanoparticles were obtained after repeated solvent-anti-solvent cleaning and dispersed in the dodecylamine to obtain a gold nanoparticle solution.

1.2 An anhydrous oxygen-free high-boiling-point solvent of trioctylphosphine at 350° C. was prepared by using Schlenk line, and 0.125 mL of trisilane, 0.275 mL of the above gold nanoparticle solution (at concentration of 110 mg/mL) and 0.05 mL of additional dodecylamine were quickly injected and mixed, and then the mixed solution was rapidly cooled to room temperature, during which trisilane was broken to form silicon monomers, and the silicon monomers grew directionally on the gold nanoparticles to form a silicon quantum rod; the reacted silicon quantum rod was first dissolved in chloroform and then mixed with aqua regia, an emulsion was obtained by accelerating stirring, the aqua regia was removed by extraction, and a silicon quantum rod was obtained after washing.
(2) Cadmium-Free Semiconductor Shell Layer Coating 50 mg of the silicon quantum rod obtained above was dissolved in 3 mL of octadecene (ODE) and 3 mL of octadecylamine, exhausted at 130° C. for 1 hr, and the temperature was raised to 220° C., and then the temperature rate was fixed at 12° C./min until reaching 310° C. at which the temperature was held. During this process, a calculated amount of $Zn(OA)_2$ and TOP-Se was slowly injected at an injection rate of 2 mL/hr from 220° C., forming a first shell layer (ZnSe layer), and was cooled down to 200° C., 1 mL of oleylamine (OAm) was injected and stabilized for 1 hr, then the temperature was heated to 220° C. The fixed heating rate was 12° C./min, until reaching 310° C. at which the temperature was held. During this process, the calculated amount of Zn(OA) 2 and TOP-S were slowly injected at an injection rate of 2 mL/hr from 220° C. to form a second shell layer (ZnS layer), the first shell layer and the second shell layer constituted a cadmium-free semiconductor shell coating, and finally a core-shell quantum dot (represented by Si/ZnSe/ZnS) was obtained.

Figure 2:
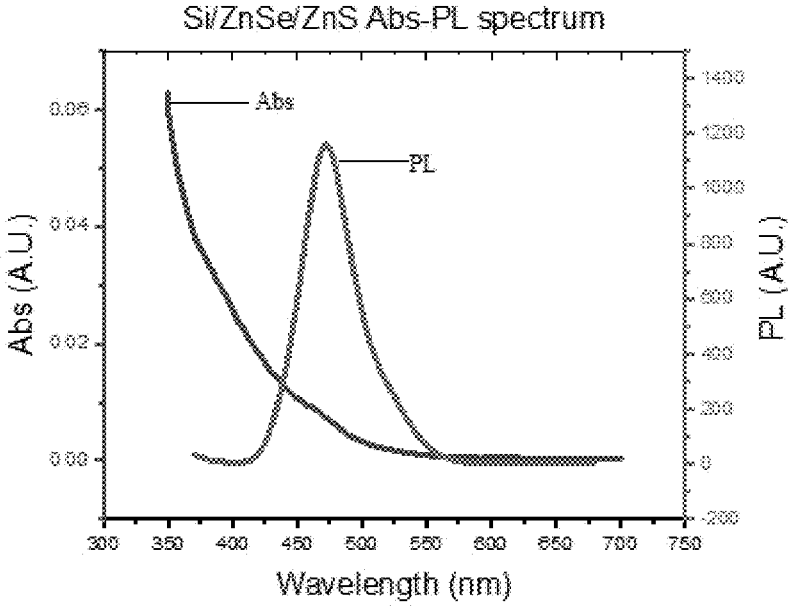
FIG. 2 is a diagram of the luminescence detection effect of the core-shell quantum dot prepared in an embodiment of the present application.

The absorbance Abs (AU) test and photoluminescence PL (AU) test were carried out on the obtained core-shell quantum dot, and the results are shown in FIG. 2; through the absorption and excitation emission spectra of the core-shell quantum dot, it can be known that the core-shell quantum dot has excellent luminous properties.

Example 2

A core-shell quantum dot includes a silicon quantum rod and a cadmium-free semiconductor shell layer coated on the surface of the silicon quantum rod. The preparation method includes the following steps:
(1) Preparation of Silicon Quantum Rod 1.1 4 mmol of tetraoctyl ammonium bromide (TOAB) was dissolved in 80 mL of toluene to obtain a tetraoctyl ammonium bromide solution, and 0.77 mmol of tetrachloroaurate trihydrate was dissolved in 30 mL of deionized water to obtain a tetrachloroauric acid trihydrate solution. The above-mentioned tetraoctylammonium bromide solution was stirred rapidly at a speed of 600 rpm, and the tetrachloroauric acid trihydrate solution was rapidly added thereto, an emulsion was obtained through a separating funnel after 1 hr, and 0.84 mmol of dodecanethiol was added thereto and stirred for 5 min; 0.4 M NaBH 4 solution was slowly injected for a reduction reaction, and pure gold nanoparticles were obtained after repeated solvent-anti-solvent cleaning and dispersed in dodecylamine to obtain a gold nanoparticle solution.

1.2 An anhydrous oxygen-free high-boiling-point solvent of trioctylamine at 350° C. was prepared by using Schlenk line, and 0.125 mL of trisilane, 0.275 mL of the above gold nanoparticle solution (at a concentration of 55 mg/mL) and 0.05 mL of additional dodecylamine were quickly injected and mixed, and then the mixed solution was rapidly cooled to room temperature, during which trisilane was broken to form silicon monomers, and the silicon monomers grew directionally on the gold nanoparticles to form a silicon quantum rod; the reacted silicon quantum rod was first dissolved in chloroform and then mixed with aqua regia, an emulsion was obtained by accelerating stirring, the aqua regia was removed by extraction, and a silicon quantum rod was obtained after washing.

(2) Cadmium-Free Semiconductor Shell Coating 50 mg of the silicon quantum rod obtained above was dissolved in 3 mL of octadecene (ODE) and 3 mL of octadecylamine, exhausted at 130° C. for 1 hr, and the temperature was raised to 220° C., and then the temperature rate was fixed at 12° C./min until reaching 310° C. at which the temperature was held. During this process, a calculated amount of Zn(OA) 2 and TOP-Se was slowly injected at an injection rate of 2 mL/hr from 220° C., forming a first shell layer (ZnSe layer), and was cooled down to 200° C., 1 mL of oleylamine (OAm) was injected and stabilized for 1 hr, then the temperature was heated to 220° C. The fixed heating rate was 12° C./min, until reaching 310° C. at which the temperature was held. During this process, a calculated amount of Zn(OA) 2 and octane thiol were slowly injected at an injection rate of 2 mL/hr from 220° C. to form a second shell layer (ZnS layer), the first shell layer and the second shell layer constituted a cadmium-free semiconductor shell coating, and finally a core-shell quantum dot (represented by Si/ZnSe/ZnS) was obtained.

The absorbance and photoluminescence test results of the core-shell quantum dot were similar to those of Example 1.

The above are only optional embodiments of the present application, and are not intended to limit the present application. For those skilled in the art, various modifications and changes may be made based on the present application. Any modifications, equivalent replacements, improvements, etc. made within the spirit and principles of the present application shall be included within the scope of the claims of the present application.

What is claimed is:

1. A preparation method of a core-shell quantum dot, comprising following steps:

providing a silicon quantum rod; and growing a cadmium-free semiconductor shell layer on a surface of the silicon quantum rod to obtain a core-shell quantum dot.

2. The preparation method of a core-shell quantum dot as claimed in claim 1, wherein a preparation method of the silicon quantum rod comprises following steps:

adding a silicon precursor and a gold nanoparticle into a solvent with a temperature ≥350° C., and directionally growing the silicon quantum rod on the gold nanoparticle to obtain an Au—Si nanorod; and washing the Au—Si nanorod to remove the gold nanoparticle to obtain the silicon quantum rod.

3. The preparation method of a core-shell quantum dot as claimed in claim 2, wherein the step of adding a silicon precursor and a gold nanoparticle into a solvent with a temperature ≥350° C. comprises: first dispersing the gold nanoparticle in alkylamine to obtain a gold nanoparticle dispersion, and adding the gold nanoparticle dispersion and the silicon precursor to the solvent.

4. The preparation method of a core-shell quantum dot as claimed in claim 2, wherein in the step of adding a silicon precursor and a gold nanoparticle into a solvent with a temperature ≥350° C., the temperature of the solvent ranges from 350° C. to 450° C.

5. The preparation method of a core-shell quantum dot as claimed in claim 2, wherein the solvent is at least one selected from trioctylphosphine and trioctylamine.

6. The preparation method of a core-shell quantum dot as claimed in claim 2, wherein the silicon precursor is at least one selected from trisilane and tetrasilane.

7. The preparation method of a core-shell quantum dot as claimed in claim 2, wherein the step of cleaning the Au—Si nanorod comprises: adding the Au—Si nanorod into chloroform and aqua regia, and carrying out an extraction process.

8. The preparation method of a core-shell quantum dot as claimed in claim 1, wherein the step of growing a cadmium-free semiconductor shell layer on a surface of the silicon quantum rod comprises:

dissolving alkylamine and the silicon quantum rod in an organic solvent, and then injecting a cadmium-free semiconductor precursor material under heating to obtain the cadmium-free semiconductor shell layer coating the silicon quantum rod.

9. The preparation method of a core-shell quantum dot as claimed in claim 8, wherein a temperature of the heating is 220-310° C.

10. The preparation method of a core-shell quantum dot as claimed in claim 9, wherein a heating rate of the heating is 11-12° C./min.

11. The preparation method of a core-shell quantum dot as claimed in claim 8, wherein the alkylamine is selected from alkylamines with 10-20 carbon atoms.

12. The preparation method of a core-shell quantum dot as claimed in claim 8, wherein a molar ratio of the alkylamine to silicon atoms in the silicon quantum rod is 8-12:1.

13. The preparation method of a core-shell quantum dot as claimed in claim 8, wherein the number of times of injecting the cadmium-free semiconductor precursor material is at least one, and the cadmium-free semiconductor shell layer obtained comprises at least one layer of a cadmium-free semiconductor material.

14. The preparation method of a core-shell quantum dot as claimed in claim 8, wherein the cadmium-free semiconductor material of the cadmium-free semiconductor shell layer is one or more selected from a group II-VI compound, a group III-V compound, a group IV-VI compound, a group I-III-VI compound, and a group II-IV-VI compound, and does not contain cadmium.

15. A core-shell quantum dot, comprising a silicon quantum rod and a cadmium-free semiconductor shell coating a surface of the silicon quantum rod.

16. The core-shell quantum dot as claimed in claim 15, wherein an alkylamine ligand is bound to a surface of the cadmium-free semiconductor shell layer.

17. The core-shell quantum dot as claimed in claim 16, wherein the alkylamine ligand is selected from alkylamine ligands with 10 to 20 carbon atoms.

18. The core-shell quantum dot as claimed in claim 16, wherein a molar ratio of the alkylamine ligand to silicon atoms in the silicon quantum rod is 8-12:1.

19. The core-shell quantum dot as claimed in claim 15, wherein the cadmium-free semiconductor shell layer comprises at least one layer of a cadmium-free semiconductor material.

20. The core-shell quantum dot as claimed in claim 15, wherein the cadmium-free semiconductor material of the cadmium-free semiconductor shell layer is one or more selected from a group II-VI compound, a group III-V compound, a group IV-VI compound, a group I-III-VI compound, and a group II-IV-VI compound, and is free of cadmium.

\* \* \* \* \*